United States Patent [19]

Kobayashi et al.

[11] Patent Number: 4,587,938
[45] Date of Patent: May 13, 1986

[54] CONTROL DEVICE FOR CONTROLLING AIR-FUEL RATIO AND SPARK TIMING OF AN INTEGRAL COMBUSTION ENGINE

[75] Inventors: Nobuyuki Kobayashi, Toyota; Katsunori Yagi, Toyoake; Toshimitsu Ito, Toyota, all of Japan

[73] Assignee: Toyota Jidosha Kabushiki Kaisha, Toyota, Japan

[21] Appl. No.: 731,436

[22] Filed: May 7, 1985

[30] Foreign Application Priority Data

May 7, 1984 [JP] Japan ................... 59-91592

[51] Int. Cl.4 ............................ F02P 5/00; F02B 23/00
[52] U.S. Cl. ..................... 123/416; 123/417; 123/480
[58] Field of Search ............... 123/416, 432, 306, 417, 123/423, 480, 325, 329, 407, 188 M, 308

[56] References Cited

U.S. PATENT DOCUMENTS

| | | | |
|---|---|---|---|
| 4,377,996 | 3/1983 | Yamaguchi | 123/416 |
| 4,385,606 | 5/1983 | Hettori et al. | 123/416 |
| 4,438,741 | 3/1984 | Okumura et al. | 123/188 M |
| 4,452,204 | 6/1984 | Matsubaru | 123/416 |
| 4,478,185 | 10/1984 | Obayashi et al. | 123/416 |
| 4,503,822 | 3/1985 | Kobuyashi et al. | 123/416 |

FOREIGN PATENT DOCUMENTS

58-143108 8/1983 Japan .

*Primary Examiner*—Raymond A. Nelli
*Attorney, Agent, or Firm*—Cushman, Darby & Cushman

[57] ABSTRACT

A control device determining the air-fuel ratio in the leanest fashion or in the leaner fashion depending on the position of the throttle valve. The ignition timing is also determined in relation to the air-fuel ratio. The ignition timing is advanced when the air-fuel ratio is in the leanest fashion and the ignition timing is retarded with respect to the former timing when the air-fuel ratio is in the leaner fashion. The control device further causes a delay in change-over of the ignition timing between two timing patterns relative to the change-over of the air fuel ratio when the opening of the throttle valve is changed beyond the predetermined value.

10 Claims, 9 Drawing Figures

CONTROL DEVICE FOR CONTROLLING AIR-FUEL RATIO AND SPARK TIMING OF AN INTEGRAL COMBUSTION ENGINE

BACKGROUND OF THE INVENTION

1. Field of the Invention

The present invention relates to a control device for controlling the air-fuel ratio and the ignition timing of an internal combustion engine which can operate with a lean air-fuel mixture.

2. Description of the Related Art

Nowadays, there is considerable interest in designing an internal combustion engine which can operate with a lean air-fuel mixture and thus achieve greater fuel economy. Many improvements have been made in internal combustion engines for that purpose.

For example, U.S. Pat. No. 4,438,741 discloses an improved internal combustion engine having a helical intake port with a straight inlet portion and a helically shaped portion around an intake valve. In that patent, a bypass port is branched from the straight inlet portion and merged into the end of the helically shaped portion of the helical port. A bypass valve is arranged in the bypass port, which is opened when the engine speed and load are high and closed when the speed and load are low. Since a large volume of air can flow into the combustion chamber via both the helical port and the bypass port when the bypass valve is opened, the helical port is free from flow resistance during high load conditions, so that it can be shaped to create a strong swirl in the combustion chamber when the bypass passage is closed. The swirl assists combustion to enable sufficient burning speed for required engine performance even when the air-fuel ratio is relatively lean.

Electronic control devices associated with microcomputers have come into increased use in an internal combustion engines. Such electronic control devices enable control of the air-fuel ratio, fuel injection timing, and ignition timing in response to variable engine operating conditions. This in turn enables the engine to operate with an air-fuel mixture leaner than the theoretical air-fuel ratio when the engine does not require high power.

Japanese Unexamined Patent Publication (Kokai) No. 58-143108 discloses a method of controlling the air-fuel ratio using an oxygen sensor; which outputs a current typically at air-fuel ratios leaner than the theoretical air-fuel ratio and a outputs a voltage at the theoretical air-fuel ratio.

In combustion with a lean air-fuel mixture, it is preferable to simultaneously control the spark timing in relation to the air-fuel ratio. For example, the ignition timing is preferably retarded when the air-fuel ratio is relatively small (relatively rich) since knocking can be prevented by retarding the ignition timing. The ignition timing is preferably advanced when the air-fuel ratio is relatively large (relatively lean) as compared to that when the air-fuel ratio is at the theoretical value so as to prevent the instability of combustion which might occur with the lean air-fuel ratio.

SUMMARY OF THE INVENTION

It is an object of the invention to provide a control device for controlling the air-fuel ratio and the ignition timing of an internal combustion engine, in which a relatively lean air-fuel ratio can be realized and the ignition timing can be controlled in relation to the change in the air-fuel ratio.

The internal combustion engine has a fuel injector, a spark plug, and a throttle valve. The control device, according to the invention, comprises first sensor means for sensing engine operating conditions representative of the quantity of the intake air introduced into the engine and second sensor means for sensing whether the opening of the throttle valve is above a predetermined value. The first sensor means comprises preferably a pressure sensor sensing the pressure of the intake air, and the second sensor mean comprises a switch which makes contact at the half throttle of the throttle valve.

The control device further comprises a fuel injection control means including means for determining the air-fuel ratio in response to outputs from the first and the second sensor means such that the air-fuel ratio is determined in a first fashion with a first predetermined lean limit value when the opening of the throttle valve is below the predetermined value and in a second fashion with a second predetermined lean limit value when the opening of the throttle valve is above the predetermined value. The first lean limit value is larger than the second lean limit value. Thus, the air-fuel ratio is determined by the quantity of the intake air and by the position of the throttle valve. The air-fuel ratio in the first fashion is leaner than that in the second fashion, which may still be leaner than the theoretical air-fuel ratio. The above-stated air-fuel ratios are alternated between in relation to the position of the throttle valve.

The control device further comprises ignition control means including means for determining ignition timing in response to outputs from the first and second sensor means such that the ignition timing is determined in a first timing pattern in relation to the air-fuel ratio in the first fashion and in a second timing pattern in relation to the air-fuel ratio in the second fashion, the first timing pattern being substantially on the advance side with respect to the second timing pattern. These spark timing patterns can be provided on separate ignition timing maps, respectively. Thus, when the air-fuel ratio changes in response to the movement of the throttle valve, the spark timings may change. However, the change-over of the ignition timing is delayed, according to the present invention, relative to the change-over of the air-fuel ratios.

DESCRIPTION OF THE PREFERRED EMBODIMENT

Figure 1:
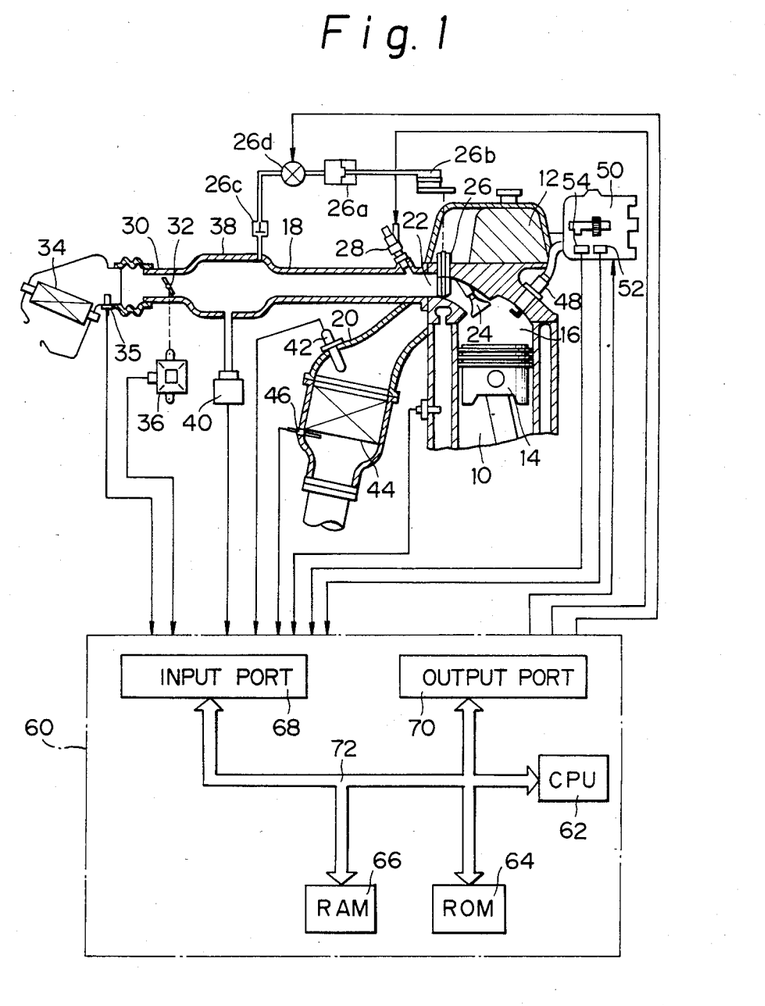
FIG. 1 is a general view of an internal combustion engine according to the present invention.
Figure 2:
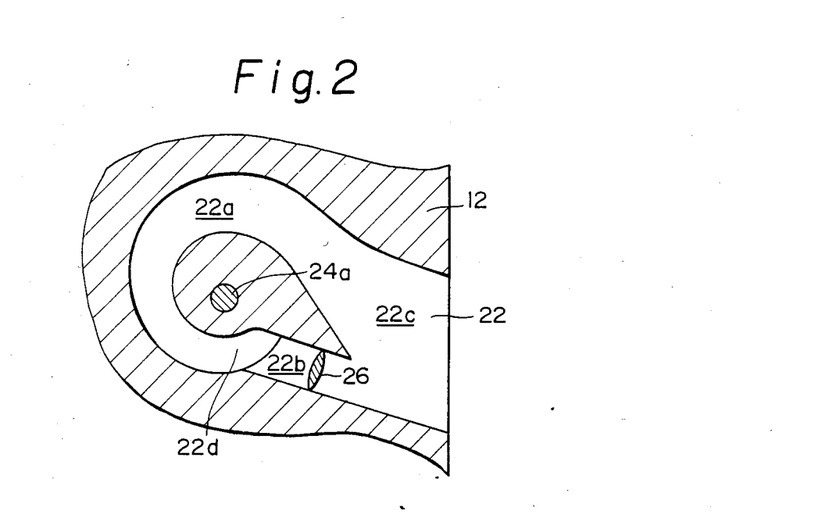
FIG. 2 schematically illustrates the helically shaped intake port of FIG. 1, having a bypass port branched therefrom and a bypass valve.

Referring first to FIG. 1, the internal combustion engine comprises a cylinder block 10, a cylinder head 12, a piston 14, and a combustion chamber 16. An intake manifold 18 and an exhaust manifold 20 are fixed to the cylinder head 12 so as to communicate with the combustion chamber 16 through an intake port 22 and exhaust port (not shown), respectively. An intake valve 24 and a bypass valve 26 are shown in FIG. 1. The intake port 22 comprises a helically shaped port 22a around a valve stem 24a of the intake valve 22 and a bypass port 22b (FIG. 2). The bypass port 22b is branched from the straight inlet portion 22c of the helically shaped port 22a and merges into the end portion 22d of the helical port 22a. The bypass valve 26 is arranged in the bypass port 22b and mechanically connected to a vacuum operated actuator 26a through a linkage 26b. The actuator 26a is connected to the intake manifold 18 through a check valve 26c and a solenoid operated three-way valve 26d for introducing the vacuum. By controlling the excitation of the solenoid valve 26d, the bypass valve 26 can be opened when the engine speed and load are high and closed when the engine speed and load are low.

A fuel injector 28 is arranged on each branch of the intake manifold 18. The intake manifold 18 is further connected to a throttle body 30 with a throttle valve 32 and to an air cleaner 34. A temperature sensor 35 is arranged just downstream of the air cleaner for sensing the temperature of the intake air.

Figure 3:
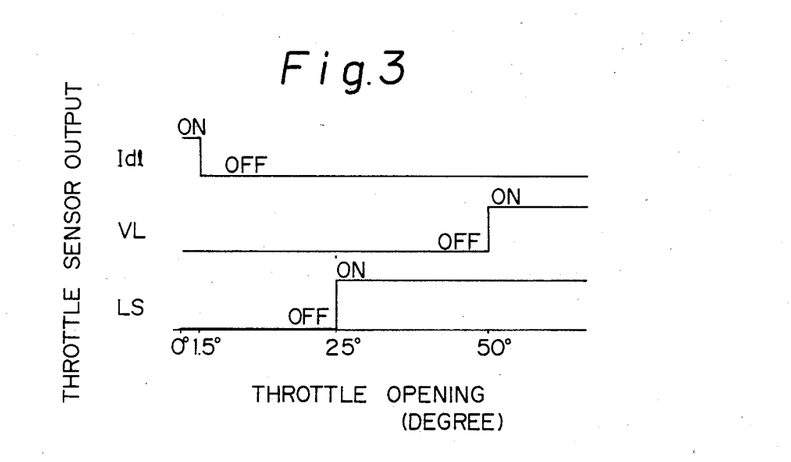
FIG. 3 illustrates output signals of the throttle position sensor of FIG. 1.

A throttle position sensor 36 is arranged on the throttle body 30. As is well known, the throttle position sensor 36 comprises a movable shaft which can move conjointly with the throttle valve 32, the movable shaft having a movable contact thereon. According to the invention, three stationary contacts are provided on the case of the throttle position sensor 36. These stationary contacts are located at an idle position, an intermediate position, and a full throttle position of the throttle valve 32, respectively. The movable contact and each of the stationary contacts cooperate to define respective switches and produce respective signals, as shown in FIG. 3. One of them, referred to as an "idle switch (Idl)", makes contact between zero to 1.5 degrees of the throttle opening. The next one, referred to as a "lean switch (LS)", makes contact above 25 degrees of the throttle opening. The third, referred to as a "full throttle switch (VL)", makes contact above 50 degrees of the throttle opening.

Again in FIG. 1, at the collecting portion 38 of the intake manifold 18, a pressure sensor 40 is arranged for sensing the absolute pressure of the intake air. On the exhaust manifold 20, an oxygen sensor 42 is arranged, which, as stated above, outputs a current typically at air-fuel ratios leaner than the theoretical ratio and outputs a voltage typically at the theoretical air-fuel ratio. This oxygen sensor 42 is adapted to be used for feedback control of the air-fuel ratio even at the lean values. Downstream of the oxygen sensor 42 is a catalytic converter 44 and a temperature sensor 46 for the exhaust gas.

A spark plug 48 protrudes into the combustion chamber 16. A distributor 50 supplies the spark plug 48 with high voltage, as is known. A speed sensor 52 for sensing the speed of the engine and a position sensor 54 for sensing the reference position of the crankshaft of the engine are incorporated in the distributor 50 in the well known manner. Further, a transistor circuit commonly called an ignitor is incorporated in the distributor 50.

Control means 60 comprises a microcomputer system including a central processing unit (CPU) 62, a read-only memory (ROM) 64, a random-access memory (RAM) 66, an input port 68, and an output port 70, these elements being interconnected by a bidirectional bus 72. Inputs from the above-stated sensors are delivered to the input port 68 which may include an analog to digital (A/D) converter for analog inputs. The control means 60 delivers control signals through the output port 70 to the fuel injector 28, the ignitor in the distributor 50, and the solenoid valve 26d. For this purpose, the CPU 62 processes the inputs from the sensors according to the program stored in the ROM 64. The RAM 66 can temporarily store the input data from the sensors. The following controls are processed by the control circuit 60 based on the sensor signals.

Figure 4:
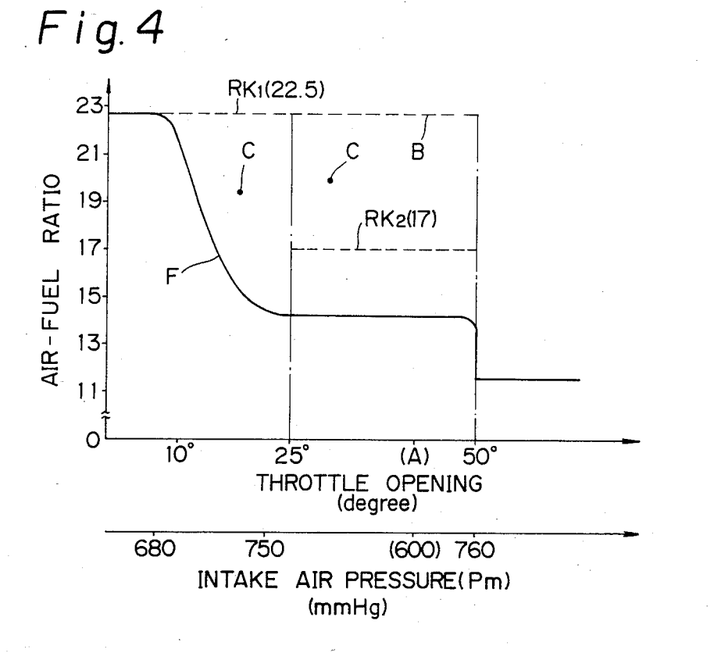
FIG. 4 is a graph of the air-fuel ratio controlled according to the invention.
Figure 5:
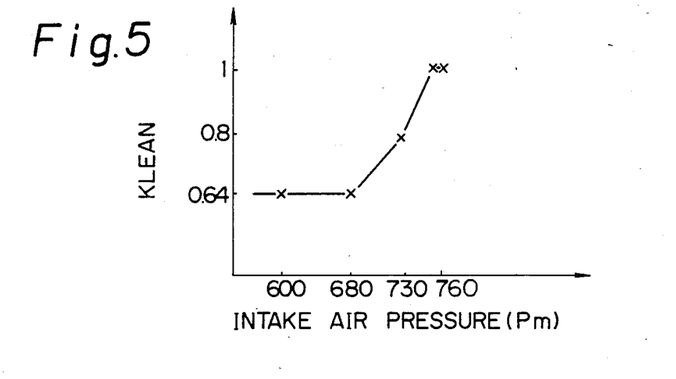
FIG. 5 is a map of the lean correction factor for the fuel injection.
Figure 6:
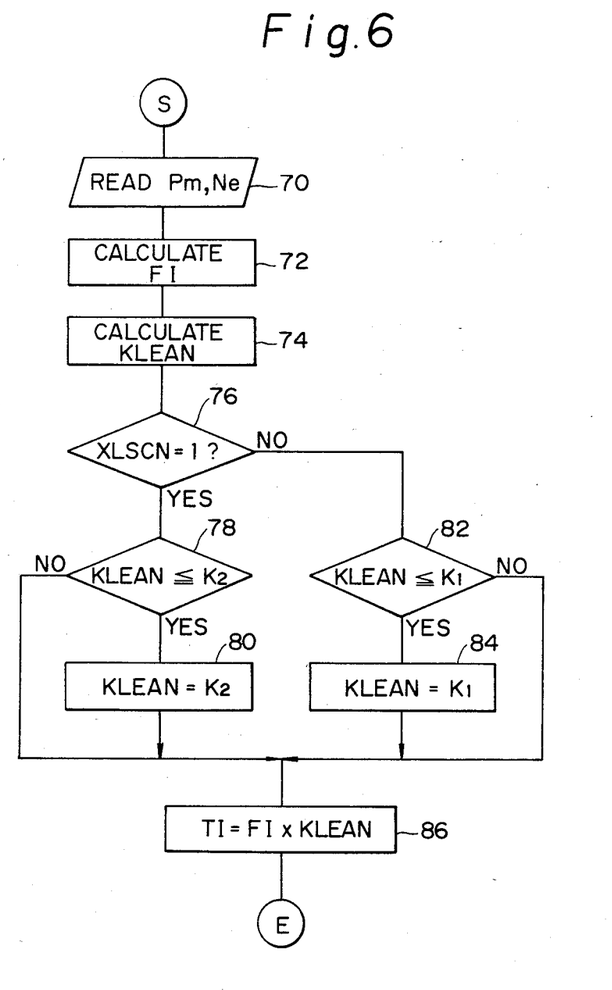
FIG. 6 is a flow chart for realizing the control of the air-fuel ratio of FIG. 4.

Referring now to the FIGS. 4 to 6, the control of the air-fuel ratio is described first. The solid curve F in FIG. 4 indicates a desired air-fuel ratio with respect to the engine load, i.e., the throttle opening, the engine revolution assumed to be constant. It can be seen that the air-fuel ratio is about 12 at the full throttle opening, about 14.5 (theoretical air-fuel ratio) at the intermediate throttle opening, and about 22.5 at the small throttle opening. Such an air-fuel ratio is basically determined by steps such as steps 70 to 74 in FIG. 6. Namely, during every revolution of the engine, the intake air pressure Pm and the engine speed Ne are read (step 70), then the quantity of fundamental fuel injection FI is calculated based on Pm and Ne (step 72), with the FI providing the theoretical air-fuel ratio. Then, correction factors are calculated and multiplied with the FI, for obtaining the air-fuel ratio for particular engine operating conditions, for example, for engine warming-up or acceleration.

As the present invention relates to the control of the lean air-fuel ratio, only one of the correction factors is represented in step 74, as a correction factor KLEAN. The correction factor KLEAN can be calculate from a map such as shown in FIG. 5, which is stored in the ROM 64 as a function of the Pm and Ne.

Usually, the process will end by multiplying the FI with KLEAN, resulting in the air-fuel ratio represented by the curve F. However, one problem arises: The lowermost horizontal axis in FIG. 4 indicates the intake air pressure Pm in correspondence with the throttle opening at the level ground. Since the sensed intake air pressure Pm includes atmospheric pressure, which decreases as the altitude increases, the sensed intake air pressure Pm becomes smaller at high altitudes, possibly 600 mmHg when the throttle opening is A degrees in the intermediate throttle opening region. In such a case, KLEAN may be calculated to be 0.64 (see FIG. 5). As a result, the air-fuel ratio becomes 22.5, as indicated at a point B in FIG. 4. This is too lean for the intermediate throttle opening and abruptly changes to 12 when the throttle valve 32 is moved to the full open position. This results in less stable combustion and an uncomfortable driving feeling.

According to the invention, the air-fuel ratio is determined by using a signal of the lean switch LS of the throttle position sensor 36 as well as the intake air pressure Pm. As described previously, the lean switch LS makes contact above 25 degrees of the throttle opening. KLEAN is first calculated in step 74 in FIG. 6, from the map in FIG. 5, based on Pm and Ne. KLEAN may provide the air-fuel ratio represented by the point B, a point C, or a point on the curve F.

At step 76, the program branches into two. It should be understood that flag XLSCN=1 when the lean switch LS makes contact and flag XLSCN=0 when the lean switch LS breaks.

Therefore, the program will go to step 78 if the lean switch LS makes contact. KLEAN calculated at step 74 is compared with a predetermined lean limit factor $K_2$. The predetermined lean limit factor $K_2$ is selected to provide the air-fuel ratio of 17 ($RK_2$) as shown in FIG. 4. If "YES" IN STEP 78, KLEAN is reset to $K_2$. If "NO", KLEAN is as it is. This means that, if the throttle opening is between 25 degrees and 50 degrees, the air-fuel ratio will be 17 at the leanest even if the altitude is very high. In another branch, KLEAN is similarly compared with another predetermined lean limit factor $K_1$ (step 82) and KLEAN is reset to $K_1$ if "YES" (step 84). It will be noted that the lean limit factor $K_1$ is smaller than the lean limit factor $K_2$, i.e., the lean limit air-fuel ratio $RK_1$ when the throttle opening is below 25 degrees is larger than the lean limit air-fuel ratio $RK_2$ when the throttle opening is above 25 degrees. In step 86, the quantity of the total fuel injection TI is obtained by multiplying F1 and KLEAN.

Figure 7:
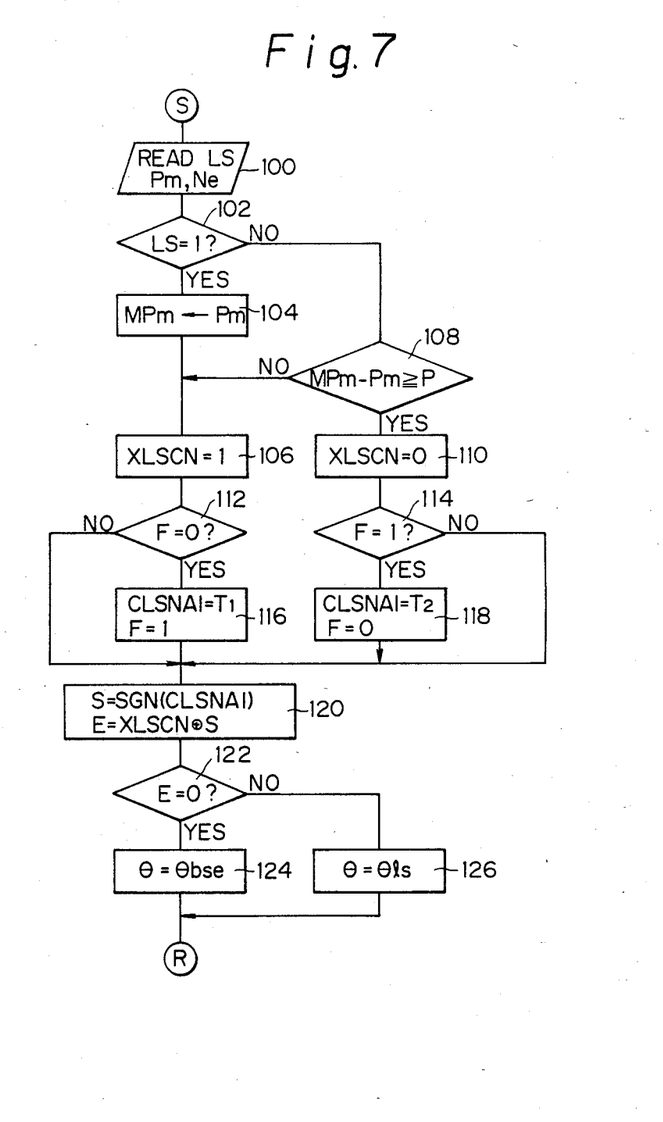
FIG. 7 is a flow chart for realizing the control of the ignition timing.

With the above-described control of the air-fuel ratio, the ignition timing is controlled in accordance with program of FIG. 7, which starts, for example, by interruption every 20 milliseconds. In step 100, a signal from the lean switch LS, the intake air pressure Pm, and the engine speed Ne are read. Step 102 judges whether the opening of the throttle valve 32 is above the predetermined intermediate value, 25 degrees. It is assumed that this program goes on when both the idle switch Idl and the full throttle switch VL are "OFF". Separate idle speed control may be processed if the idle switch is "ON", and power enrichment may be processed to obtain the air-fuel ratio of 12 if the full throttle switch VL is "ON". If "YES" in step 102, the program goes through step 104 to step 106 to set the flag XLSCN=1. If "NO", the program goes through step 108 to step 110 to reset the flag XLSCN=0. This flag XLSCN is used in step 76 in FIG. 6 for selecting one of the air-fuel ratios in the two branches depending on the throttle opening.

Steps 104 and 108 are provided for stabilizing control of the system to eliminate the influence of possible chattering of the lean sensor LS. In step 104, a label MPm is set, which represents the latest value of the intake air pressure Pm while the lean switch LS is "ON". Step 108 judges if the lean switch LS eventually changes its output, by comparing MPm - Pm with a predetermined value $P_0$. If "YES", the program goes to step 110. If "NO", the program goes to step 106, considering chattering. This procedure is schematically shown in the upper three characteristic curves in FIG. 9.

The program goes to step 112 or 114, after step 106 or 110, respectively. A flag F is used for setting a counter CLSNAI just after the throttle valve 32 moves beyond the 25 degrees. The initialization of the program was made so that the flags F and XLSCN are zero and the MPm is a predetermined large value. The flag F is "0" when the program first goes to step 112 immediately after the lean switch LS turns "ON". Thus, the program goes to step 116 at this cycle, where the counter CLSNAI is set to $T_1$ and the flag F is set to "1". From the next cycle, the judgement in step 112 is "NO" while the lean switch LS is in the "ON" condition. When the lean switch LS is turned "OFF", the program will go to steps 108, 110, and 114. Step 114 judges "YES" the first time after the lean switch is turned "OFF", so the counter CLSNAI sets $T_2$ and the flag F is reset to "0". From the next cycle, the judgement in step 118 is "NO" while the lean switch LS is in the "OFF" condition.

Figure 8:
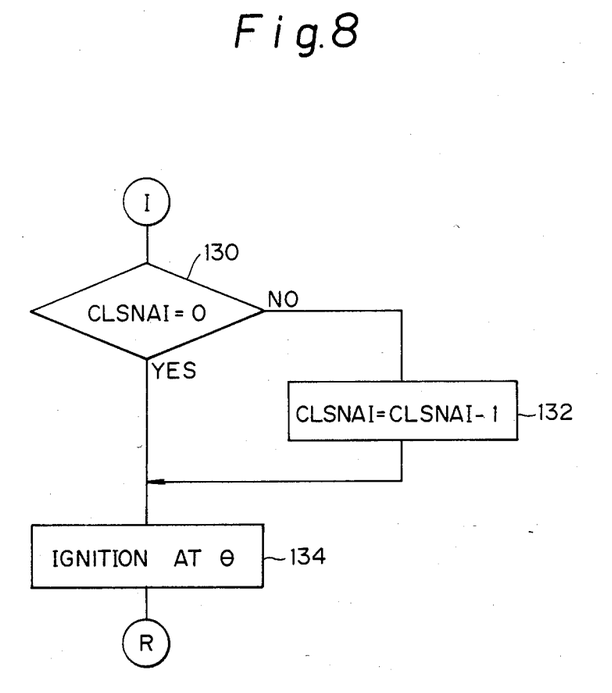
FIG. 8 is a simplified flow chart of the ignition procedure.

The counter CLSNAI may count a time period. In this preferred embodiment, the counter CLSNAI counts the number of ignitions by the spark plug 48. It will be understood that two ignitions are caused in every engine revolution if the engine has four cylinders. Such an ignition procedure is effected by a separate program, such as roughly shown in FIG. 8, in which the counter CLSNAI is watched in step 130. If the counter CLSNAI is set, the number is decremented before every ignition procedure in step 132. Then, ignition is caused at an ignition timing $\theta$. This ignition timing $\theta$ is determined by the program in FIG. 7.

In step 120 in FIG. 7, S=SGN (CLSNAI) and E=XLSCN $\oplus$ S are executed. The label S means whether the count is completed or still continuing, S=0 when the count of the counter CLSNAI is 0 and S=1 when the count of the counter CLSNAI is greater than 0. E is an Exclusive-OR logic of the flag XLSCON and the label S, the truth table being:

| XLSCON | S | E | Region |
|--------|---|---|--------|
| 0 | 0 | 0 | $e_1$ |
| 0 | 1 | 1 | $e_2$ |
| 1 | 0 | 1 | $e_3$ |
| 1 | 1 | 0 | $e_4$ |

Figure 9:
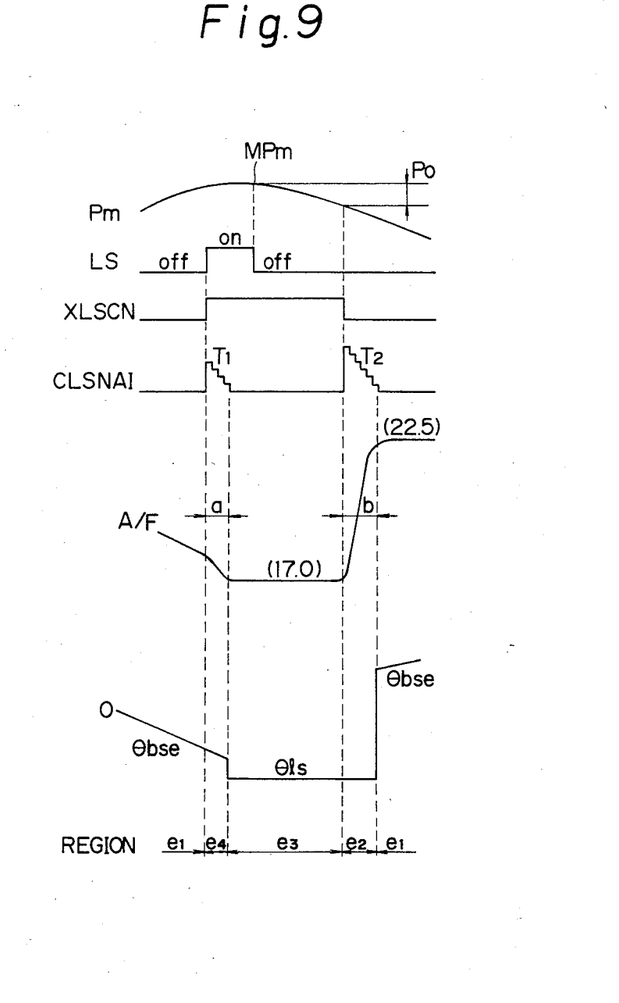
FIG. 9 is a time chart illustrating the operations of several elements in FIG. 7

The region mentioned in the truth table are indicated at the bottom of FIG. 9.

Step 122 judges whether E is "0". If "YES", the program goes to step 124 so as to select the spark timing $\theta = \theta_{bse}$. If "NO", the program goes to step 126 so as to select the spark timing $\theta = \theta_{ls}$. $\theta_{bse}$ and $\theta_{ls}$ are stored in the forms of separate maps in the ROM 64 as a function of the intake air pressure Pm and the engine speed Ne, respectively. It can be seen from FIG. 9 that the first timing pattern $\theta_{bse}$ is substantially on the spark advance side with respect to the second timing pattern $\theta_{ls}$. It will be clear that the first timing pattern $\theta_{bse}$ is determined in relation to the air-fuel ratio in a first fashion with the lean limit value $RK_1$ (22.5) defined by the correction factor $K_1$ (FIG. 4) and the second timing pattern $\theta_{ls}$ is determined in relation to the air-fuel ratio in a second fashion with the lean limit value $RK_2$ (17) defined by the correction factor $K_2$. This combination of the air-fuel ratio and the ignition timing allows the engine to operate stably with leaner air-fuel ratios.

Further, the air-fuel ratio is changed over between the two fashions at points where the flag XLSCN turns "ON" and turns "OFF", whereas the ignition timing is changed over between the two patterns $\theta_{bse}$ and $\theta_{ls}$ at delays $T_1$ and $T_2$ from the above-stated points. This resolves the problem of the difference in the communicating speed between the fluid and the electrical signal. Indeed, the actual change of the air-fuel mixture in the combustion chamber 16 is delayed as shown by the characters "a" and "b" in FIG. 9 from the change of the injected fuel, along a path from the fuel injector 28 to the combustion chamber 16. If the ignition timing is changed over simultaneously with the change-over of the air-fuel ratio, there may be retardation of the ignition timing while the acutal air-fuel ratio is still very lean. It is believed, in this regard, that a proper delay of the change-over of the ignition timing with respect to the change-over of the air-fuel ratio is of considerable significance in combustion with a relatively lean air-fuel ratio determined as lean as possible.

We claim:

1. A control device for controlling the air-fuel ratio and the ignition timing of an internal combustion engine having a fuel injector, a spark plug, and a throttle valve, said device comprising:

first sensor mean for sensing engine operating conditions representative of the quantity of the intake air introduced into the engine;

second sensor means for sensing whether the opening of the throttle valve is above a predetermined valve;

fuel injection control means including means for determining the air-fuel ratio in response to outputs from said first and second sensor means such that the air-fuel ratio is determined in a first fashion with a first predetermined lean limit value when the opening of the throttle valve is below said predetermined value and in a second fashion with a second predetermined lean limit value when the opening of the throttle valve is above said predetermined value, said first predetermined lean limit value being larger than said second predetermined lean limit value;

ignition control means including means for determining an ignition timing in response to outputs from said first and said second sensor means such that the ignition timing is determined in a first timing pattern in relation to the air-fuel ratio in said first fashion and in a second timing pattern in relation to the air-fuel ratio in said second fashion, respectively, the first timing pattern being substantially on the spark advance side with respect to said second timing pattern; and delay means which causes a delay in change-over of the ignition timing between said first and said second timing patterns relative to the change-over of the air-fuel ratio between said first and said second fashions when the opening of the throttle valve is changed beyond said predetermined value.

2. A control device according to claim 1, wherein said first sensor means comprises a pressure sensor which senses the pressure of the intake air introduced into the engine.

3. A control device according to claim 2, wherein said second sensor means comprises a switch having a conjointly movable contact with the throttle valve and a cooperating stationary contact which is located at an intermediate position between idle and full throttle positions of the throttle valve.

4. A control device according to claim 3, wherein two stationary contacts are further provided, one at the idle position and the other at the full throttle position of the throttle valve.

5. A control device according to claim 1, wherein said delay means comprises a counter for a time period.

6. A control device according to claim 1, wherein said delay means comprises a counter for the number of ignitions caused.

7. A control device according to claim 5, wherein separate spark timing maps are provided for the ignition timing in said first and in said second timing patterns, respectively.

8. A control device according to claim 7, wherein an Exclusive-OR gate is provided for selecting one of the maps in response to the engine operating conditions, said Exclusive-OR gate having one input from the counter and another input representing which fashion of the air-fuel ratio is selected.

9. A control device according to claim 6, wherein separate spark timing maps are provided for the ignition timing in said first and said timing patterns, respectively.

10. A control device according to claim 9, wherein an Exclusive-OR gate is provided for selecting one of the maps in response to the engine operating conditions, said Exclusive-OR gate having one input from the counter and another input representing which fashion of the air-fuel ratio is selected.

* * * * *